(12) United States Patent
Tian

(10) Patent No.: US 12,066,000 B2
(45) Date of Patent: Aug. 20, 2024

(54) SMART WAVE ENERGY CONVERTER WITH ADAPTIVE MOTION RESPONSE

(71) Applicant: Exmar Offshore Company, Houston, TX (US)

(72) Inventor: Zhigang Tian, Houston, TX (US)

(73) Assignee: Exmar Offshore Company, Houston, TX (US)

( * ) Notice: Subject to any disclaimer, the term of this patent is extended or adjusted under 35 U.S.C. 154(b) by 0 days.

(21) Appl. No.: 17/657,745

(22) Filed: Apr. 1, 2022

(65) Prior Publication Data

US 2022/0316939 A1  Oct. 6, 2022

Related U.S. Application Data

(60) Provisional application No. 63/169,687, filed on Apr. 1, 2021.

(51) Int. Cl.
*F03B 15/00* (2006.01)
*F03B 13/18* (2006.01)
*G01F 25/20* (2022.01)

(52) U.S. Cl.
CPC .............. *F03B 15/00* (2013.01); *F03B 13/18* (2013.01); *G01F 25/20* (2022.01); *F05B 2270/18* (2013.01); *F05B 2270/202* (2020.08)

(58) Field of Classification Search
CPC .... F03B 15/00; F03B 13/18; F05B 2270/202; F05B 2270/18
See application file for complete search history.

(56) References Cited

U.S. PATENT DOCUMENTS 5,842,838 A * 12/1998 Berg .................... F03B 13/1875
60/505
2004/0134190 A1* 7/2004 Kanki ..................... F03B 13/18
60/398

FOREIGN PATENT DOCUMENTS

WO  WO-2012018393 A2 * 2/2012 ............ F03B 13/182
WO  WO-2020010342 A1 * 1/2020 ............. B63B 22/20

* cited by examiner

*Primary Examiner* — Viet P Nguyen
(74) *Attorney, Agent, or Firm* — Osha Bergman Watanabe & Burton LLP

(57) ABSTRACT

A smart wave energy converter may include a reconfigurable floater; a reference wave frequency measurement module; a central control module; a submerged buoyancy element; one or more power take-off devices; and an anchoring system. The reconfigurable floater may be connected to the submerged buoyancy element by the one or more power take-off devices. The submerged buoyance element may be connected to the anchoring system. The reconfigurable floater may include one or more mechanisms to alter a natural heave frequency of the reconfigurable floater. The reference wave frequency measurement module may measure a frequency of a wave state and transmit a measured frequency to the central control module. The central control module may adjust a property of the one or more mechanisms to match the natural heave frequency of the reconfigurable floater to the measured frequency.

13 Claims, 3 Drawing Sheets

SMART WAVE ENERGY CONVERTER WITH ADAPTIVE MOTION RESPONSE

FIELD OF THE DISCLOSURE

Embodiments of the present disclosure generally relate to smart wave energy converters.

BACKGROUND

Various wave energy converters are disclosed in EP1439306, WO2001096738, EP1336051, EP1364124, AU2008243086, ES2422459, GB2510928, and WO2016200306 and use wave riders or wave surge motion, among other mechanisms, to drive an electricity generator.

A WEC depends on its heave response to produce electricity and its efficiency is the highest when it has the maximum motion response, typically at its natural frequency due to resonance motion. A conventional WEC has a fixed natural frequency, and its highest efficiency is at this single frequency. In the real word, the sea states change from time to time and the peak frequency/period of the sea states varies, typically from 4 sec to 8 sec. As a result, a conventional WEC cannot achieve highest efficiency across this frequency/period range.

SUMMARY OF THE CLAIMED EMBODIMENTS

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a smart wave energy converter. The smart wave energy converter may include a reconfigurable floater; a reference wave frequency measurement module; a central control module; a submerged buoyancy element; one or more power take-off devices; and an anchoring system. The reconfigurable floater may be connected to the submerged buoyancy element by the one or more power take-off devices. The submerged buoyancy element may be connected to the anchoring system. The reconfigurable floater may include one or more mechanisms to alter a natural heave frequency of the reconfigurable floater. The reference wave frequency measurement module may measure a frequency of a wave state and transmit a measured frequency to the central control module. The central control module may adjust a property of the one or more mechanisms to match the natural heave frequency of the reconfigurable floater to the measured frequency. In some embodiments, multiple smart wave energy converters according to embodiments herein may be disposed in a wave farm.

In another aspect, embodiments disclosed herein relate to a method of harvesting wave energy, the method may include disposing a smart wave energy converter in a body of water; measuring the frequency of the wave state in the body of water; transmitting the measured frequency to the central control module; automatically adjusting, via the central control module, the natural heave frequency of the reconfigurable floater; and generating power via the one or more power take-off devices.

Other aspects and advantages will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
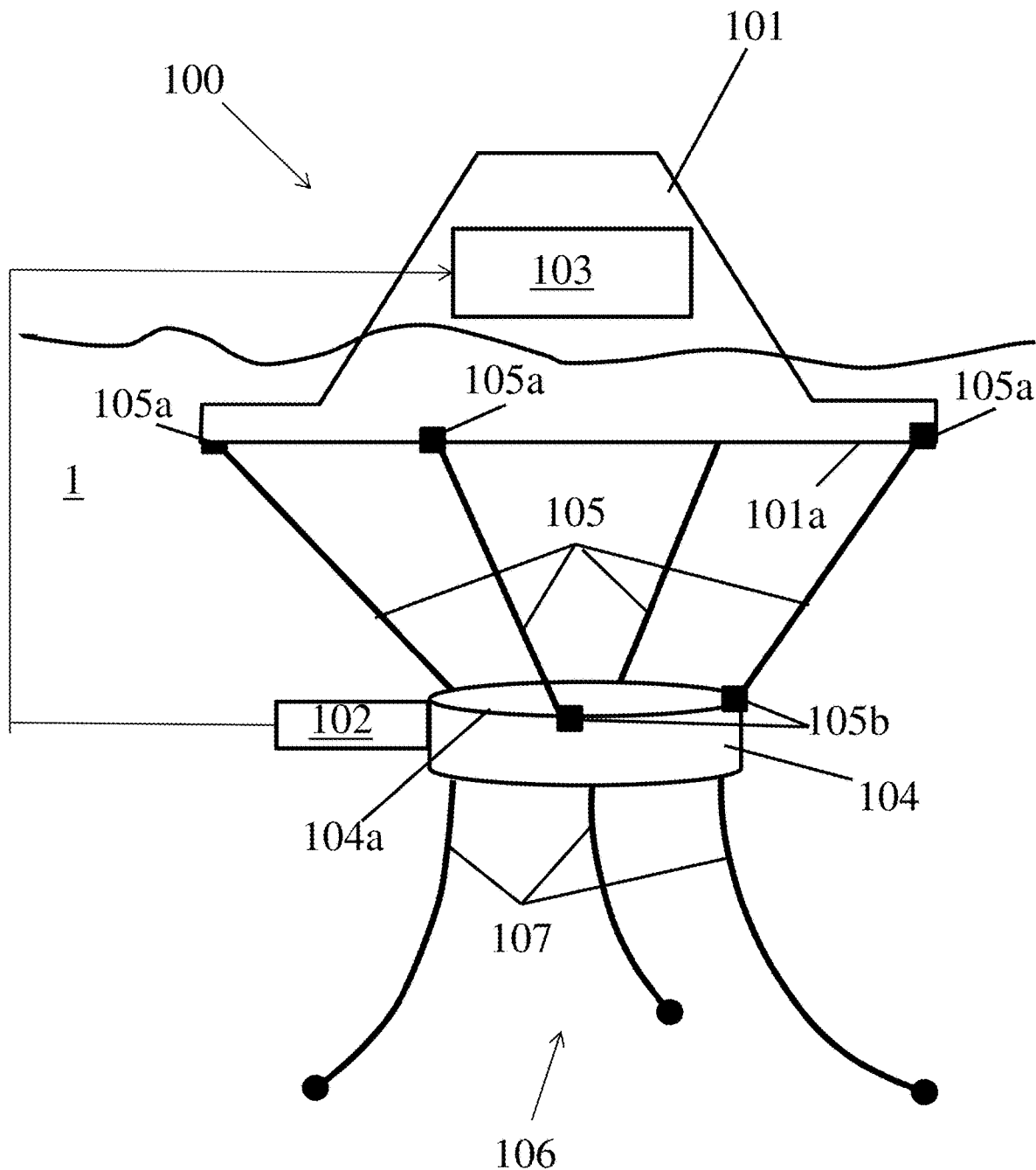
FIG. 1 illustrates a Smart Wave Energy Converter (SWEC) according to one or more embodiments disclosed herein.

Specific embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the invention. However, it will be apparent to one of ordinary skill in the art that the embodiments disclosed herein may be practiced without these specific details. In other instances, well-known features have not been described in detail to avoid unnecessarily complicating the description. Wherever possible, like or identical reference numerals are used in the figures to identify common or the same elements. The figures are not necessarily to scale and certain features and certain views of the figures may be shown exaggerated in scale for purposes of clarification.

Furthermore, those having ordinary skill in the art will appreciate that when describing a first element to a second element disposed thereon, it is understood that disposing may be either directly disposing the first element on the second element, or indirectly disposing the first element on the second element. For example, a first element may be directly disposed on a second element, such as by having the first element and the second element in direct contact with each other, or a first element may be indirectly disposed on a second element, such as by having a third element, and/or additional elements, disposed between the first and second elements. As used herein, the term "attached to" or "coupled" or "coupled to" or "connected" or "connected to" may indicate establishing either a direct or indirect connection, and is not limited to either unless expressly referenced as such. Further, embodiments disclosed herein are described with terms designating an offshore vessel in reference to a floating vessel, but any terms designating offshore structure (i.e., any platform or semi-submersible) should not be deemed to limit the scope of the disclosure.

The embodiment disclosed herein relates to a Smart Wave Energy Converter (SWEC). The SWEC enhances responsive motion via natural frequency adaptation, improving the electricity generation. In particular, the SWEC can adjust its effective wet-surface area and/or effective mass such that its motion response can achieve the highest possible, e.g., the adjustment makes its natural period closely matching the characteristic period of incident waves and hence maximize motion response for power generation.

Embodiments herein include a SWEC that adapts its natural frequency/period and captures ocean wave energy more efficiently than a Conventional Wave Energy Converter (CWEC). The SWEC achieves higher motion response for a wider wave spectrum through reconfiguration to adapt its natural period to the characteristic period of the incident wave states resulting in more wave energy for power generation. With increased capability for capturing wave energy, the Levelized Cost of Energy (LCOE) can be reduced to achieve commercial viability.

Now referring to FIG. 1, a Smart Wave Energy Converter (SWEC) system 100 is illustrated in a body of water 1. The SWEC system 100 may include a reconfigurable floater 101, a reference wave frequency measurement module 102, a central control module 103, a submerged buoyancy element 104, one or more power take-off devices 105, and an anchoring system 106.

In one or more embodiments, the reconfigurable floater 101 may produce a maximum motion relative to the submerged buoyancy element 104. The reconfigurable floater 101 is connected to the submerged buoyancy element 104 by the one or more power take-off devices 105. For example, a first end 105*a* of the one or more power take-off devices 105 is connected to the reconfigurable floater 101 and a second end 105*b* of the one or more power take-off devices 105 is connected to the submerged buoyancy element 104. The first end 105*a* may be coupled to a bottom surface 101*a* of the reconfigurable floater 101 and the second end 105*b* may be coupled to an upper surface 104*a*. The one or more power take-off devices 105 may be linear generators. For example, the linear generator may be a low damping/resistance generator. In some embodiments, the one or more power take-off devices 105 is a magnetic linear generator that uses linear motion to generate power, by using magnets to create a magnetic field, a motion of a translator will cause a magnetic flux change in a circuit formed by windings to generate power and convert mechanical energy into electrical energy.

In some embodiments, the submerged buoyancy element 104 is connected to a seabed with the anchoring system 106. The anchoring system 106 may include a plurality of lines 107, such as mooring lines or tendons, to moor, anchor, or fix on a seabed with the anchoring system 106. Alternatively, the anchoring system 106 could be a suspended dead weight.

As shown in FIG. 1, the reference wave frequency measurement module 102 may be mounted on a surface of the submerged buoyancy element 104. For example, the reference wave frequency measurement module 102 may be pressure transducer, a microphone, ultrasonic, ultrasound, sound navigation and ranging (SONAR), radio detection and ranging (RADAR), acoustic, piezoelectric, accelerometers, temperature, weight, position, or any sensor in the art to measure a peak period of a wave state. Additionally, the reference wave frequency measurement module 102 may communicate, wirelessly or through a wire, to the central control module 103 within the reconfigurable floater 101. The reference wave frequency measurement module 102 transmits a measured frequency to the central control module 103.

In one or more embodiments, the central control module 103 may be within a housing of the reconfigurable floater 101 to form a smart floater. The central control module 103 may use smart algorithms (based on machine-learning) to achieve highest motion response. For example, the control module 103 may adjust a natural frequency of the reconfigurable floater 101 to match a measured reference wave frequency from the reference wave frequency measurement module 102. For example, an effective water plane area and/or effective mass of the reconfigurable floater 101 may be changed such that the natural frequency of the reconfigurable floater 101 closely tracks and matches the peak wave frequency/period of the incident waves of the body of water 1. Additionally, smart algorithms of the central control module 103 may include feedback instructions to change the reconfigurable floater 101 to enhance its motion response.

In one or more embodiments, the central control module 103 may be a single software architecture on a computing system including one or more computer processors, non-persistent storage (e.g., volatile memory, such as random access memory (RAM), cache memory), persistent storage (e.g., a hard disk, an optical drive such as a compact disk (CD) drive or digital versatile disk (DVD) drive, a flash memory, etc.), a communication interface (e.g., Bluetooth interface, infrared interface, network interface, optical interface, etc.), and numerous other elements and functionalities. The processor(s) may be an integrated circuit for processing instructions. For example, the computer processor(s) may be one or more cores or micro-cores of a processor. Control plans for adjusting a natural frequency of the floater according to embodiments of the present disclosure may be executed on a computer processor. Additionally, it is also understood that the computing system may receive data from the sensors described herein as an input. A communication interface may include an integrated circuit for connecting the computing system to a network (not shown) (e.g., a local area network (LAN), a wide area network (WAN) such as the Internet, mobile network, or any other type of network) and/or to another device, such as another computing device. Further, the computing system may include one or more output devices, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s), non-persistent storage, and persistent storage. Many different types of computing systems exist, and the aforementioned input and output device(s) may take other forms.

Smart algorithms, e.g., software instructions, in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure. More specifically, the software instructions may correspond to computer readable program code, that when executed by a processor(s) may perform one or any of the automated control systems features described herein, including that associated with data interpretation and automated control systems to increase motion response.

Figure 2:
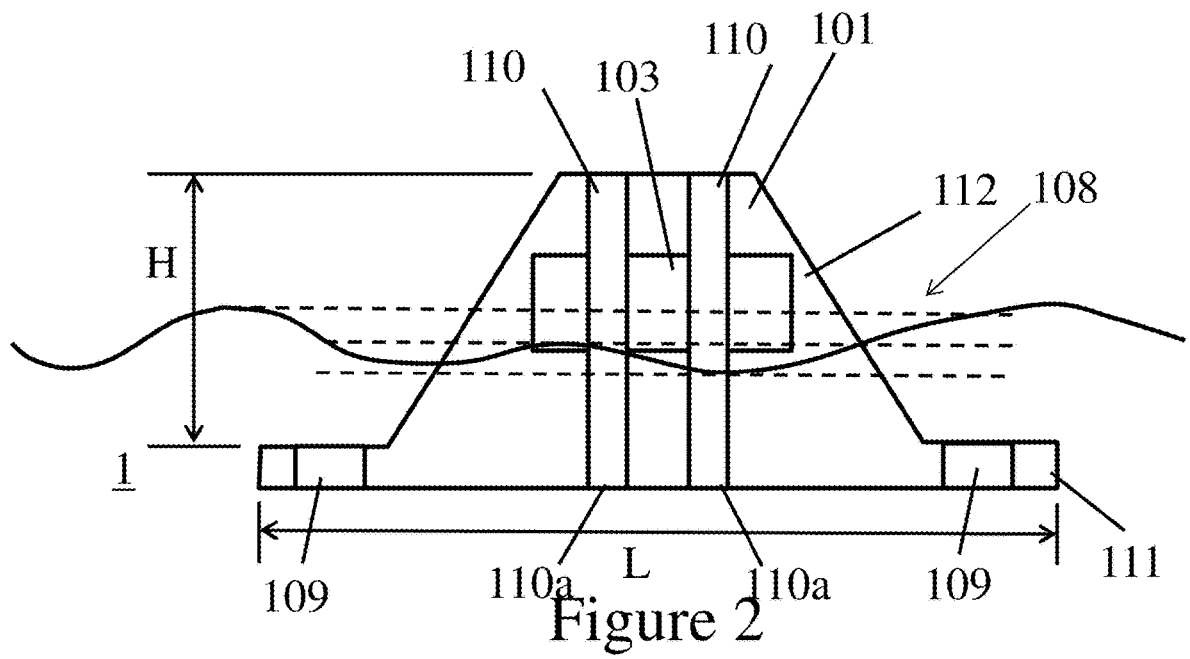
FIG. 2 illustrates the SWEC's devices/mechanisms to adapt its motion response via change of its natural frequency according to one or more embodiments disclosed herein.

Now referring to FIG. 2, a close-up view of the reconfigurable floater 101 is illustrated. The reconfigurable floater 101 may have a configuration of buoy, a box, a cylinder with varying horizontal cross section, a multi-column semi-submersible or any shape to be buoyant in the body of water 1. For example, the reconfigurable floater 101 may include a base portion 111 having a length L. An upper portion 112 of the reconfigurable floater 101 may extend a height H from the base portion 111. Additionally, the upper portion 112 may be tapered to be wider at the base portion 111 and progressively get smaller to the height H to form a cone- or wedge-shaped column.

The reconfigurable floater 101 is provided with one or more mechanisms configured to enhance motion responses such as altering the natural heave frequency of the reconfigurable floater 101. For example, the central control module 103 may include a controller to automatically adjust a property of the one or more mechanisms to produce the highest motion response possible of the reconfigurable floater 101 via smart algorithms. The one or more mechanisms may adjust the reconfigurable floater 101 by changing an effective water plane area, or changing an effective mass, or reconfiguring plates, or combination of two or more, or all, of the above. For example, the one or more mechanisms may include a ballast system (located internally to the reconfigurable floater and not shown) that takes water into and discharge water out of the floater 101, one or more central openings 110 to adjust water-plane area, one or more outer openings 109 to adjust added mass, and one or more movable plates 110 movable with respect to the openings to adjust a size of the openings.

The ballast system adjusts a buoyancy of the reconfigurable floater 101 (i.e., add or discharge seawater from an interior of the reconfigurable floater 101). The ballast system provides seawater, to be brought within the reconfigurable floater 101 to manage a weight of the reconfigurable floater 101. For example, a controller of the central control module 103 may allow seawater to enter the reconfigurable floater 101 and increase the load within the reconfigurable floater 101 to sink the reconfigurable floater 101 further within the body of water 1. Alternatively, a controller of the central control module 103 may discharge seawater out of the reconfigurable floater 101 and decrease the load within the reconfigurable floater 101 to raise up the reconfigurable floater 101 within the body of water 1.

To adjust its natural frequency/period, the effective water plane area and effective mass of the Smart Floater is designed to be easily changed with simple mechanisms that is controlled by the central control module. Several functional principles are illustrated in FIG. 2 and listed below: control the openings at base to change mass and/or added mass, control the water plane area (WPA), or a combination of all above.

The one or more openings 109, 110 include outer openings 109 extending through the base portion 111 around the perimeter of the upper portion 112 and central openings 110 extending through the base and upper portions. Moveable plates 110a in the base portion 111 may be adjusted to change the size of the outer openings 109 to change the added mass and to change the size of the central opening 110 to change the water plane area of the reconfigurable floater 101. For example, the controller of the central control module 103 may adjust the one or more openings 109, 110 to increase or decrease in size.

The one or more central openings 110 may extend from the base portion 111 to the upper portion 112. The controller of the central control module 103 may power a drive to adjust a position of the one or more movable plates 110a such that a central opening 110 is adjusted in size by moving the one or more movable plates 110a to a different positioning within the base portion 111. The movable plates 110a of the one or more openings 110 face the body of water 1 thereby changing an effective water plane area of the reconfigurable floater 101.

A Conventional Wave Energy Converter (CWEC) system can have resonant excitation at a single frequency/period. However, the SWEC will adapt its natural frequency/period to match a wider range of frequency/periods, e.g., from 3 seconds to 10 seconds or 4 seconds to 8 seconds; hence, it is capable of taking advantage of the hydrodynamic resonance response to the wider bandwidth and harvest wave energy more efficiently.

The SWEC system 100 may be used in a wave farm where multiple units will be deployed to increase energy harvest efficiency and reduce Levelized Cost of Electricity (LCOE).

A Wave Energy Converter (WEC) depends on its heave response to produce electricity and its efficiency is the highest when it has the maximum motion response, typically at its natural frequency due to resonance motion. A CWEC system has a fixed natural frequency, and its highest efficiency is at this single frequency. In the real word, the sea states change from time to time and the peak frequency/period of the sea states varies, typically from 4 sec to 8 sec. Obviously, a conventional WEC cannot achieve highest efficiency across this frequency/period range.

The SWEC system 100 aims at adapting its natural frequency/period to a range (e.g., from 4 sec to 8 sec) to maximum energy harvest efficiency. The natural frequency in heave of a WEC is determined with the following equation:

$$T_n = 2\pi \sqrt{\frac{M + M_a}{K_e + \rho g A}} \quad \text{(Eq. 1)}$$

Here, Tn is the natural period. M and Ma is the mass and the added mass of the floater, respectively; and the Added mass depends on the floater geometry. Ke is the external stiffness such as due to mooring system. Hydrostatic stiffness is $\rho g A$ with $\rho$, g and A being water density, gravitational acceleration, and water plane area (WPA), respectively.

The SWEC system 100 may change its mass, added mass, and WPA with controls to the simple devices fitted on the Smart Floater to adapt its natural frequency, as shown in FIG. 2. This feature benefits the SWEC system 100 to match a wider range of wave frequencies/periods to excite resonance response for higher energy harvest efficiency.

Figure 3:
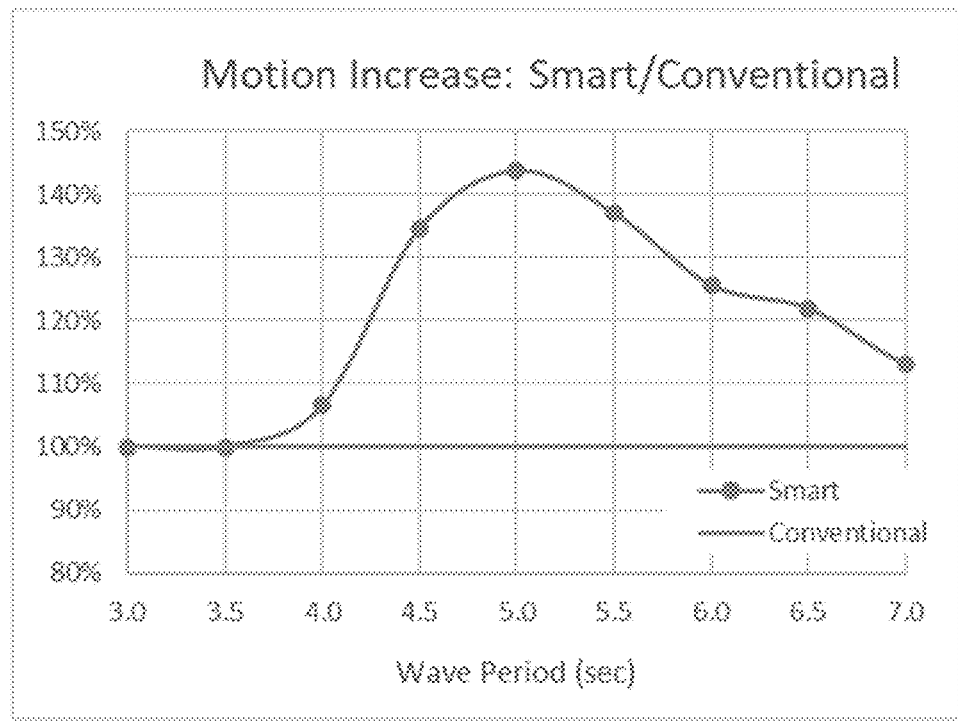
FIG. 3 is a graphical illustration comparing motion increase of a conventional WEC versus a SWEC according to embodiments herein.

As shown in FIG. 3, a comparison of the motion response of a SWEC relative to a CWEC for incident waves of a range of periods is plotted. As shown in the plotted graph of FIG. 2, for example, the SWEC system 100 may have up to 42% more of motion response than the CWEC system.

Figure 4:
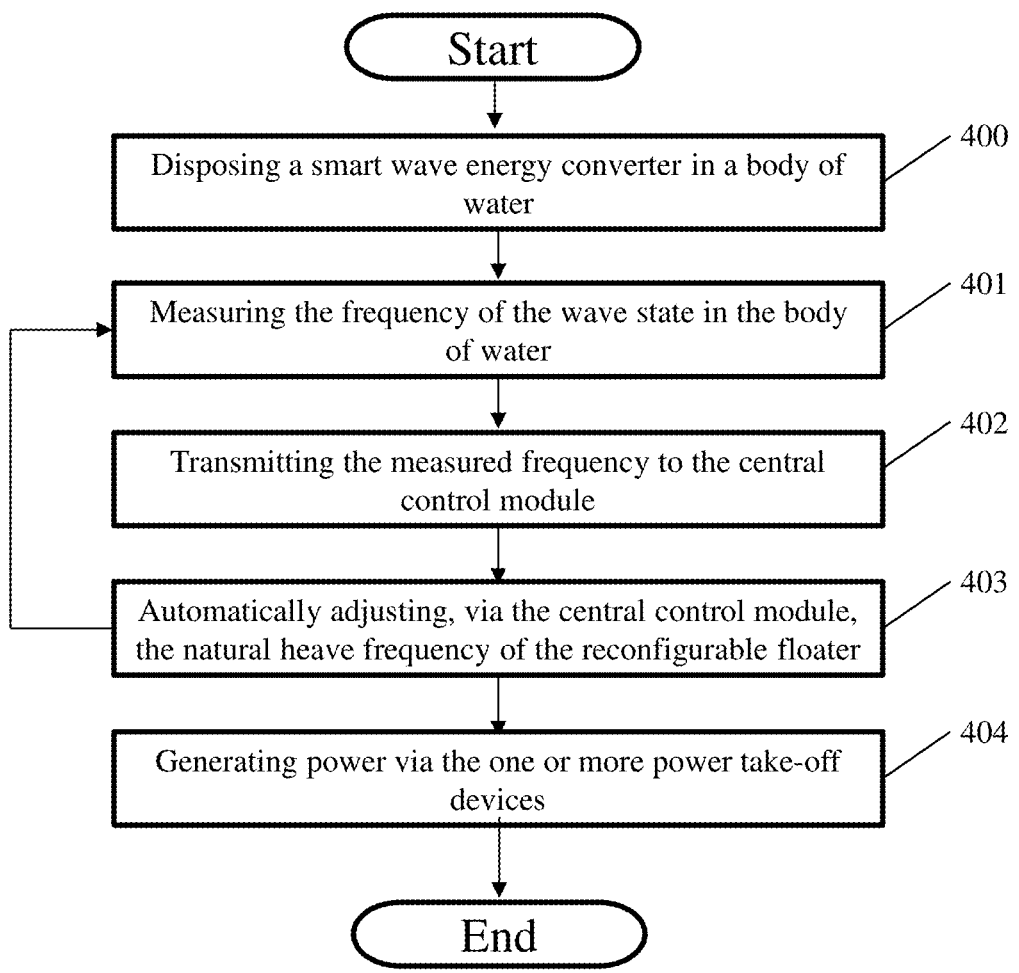
FIG. 4 illustrates a flowchart according to one or more embodiments disclosed herein

Referring to FIG. 4, a flowchart for harvesting wave energy using the SWEC system 100 is illustrated. One or more steps in FIG. 4 may be performed by one or more components, such as, a computing system coupled to a controller. For example, a non-transitory computer readable medium may store instructions on a memory coupled to a processor of a computer system such that the instructions include functionality for using the SWEC system 100.

In Step 400, a smart wave energy converter is disposed in a body of water. For example, a reconfigurable floater of smart wave energy converter is floating on a surface of the body water. Additionally, attached below the reconfigurable floater via one or more power take-off devices, a submerged buoyancy element is floating within the body of water. Further, the submerged buoyancy element is anchored within the body of water with an anchoring system. For example, a plurality of lines of the anchoring system moor, anchor, or fix the submerged buoyancy element on a seabed.

Alternatively, the submerged buoyancy element may be suspended in the body of water with a dead weight of the anchoring system.

In Step 401, a frequency of a wave state in the body of water is measured. For example, a reference wave frequency measurement module mounted on the submerged buoyancy element measures the frequency. The reference wave frequency measurement module may be a pressure transducer to measure a pressure exerted by the body of water on the submerged buoyancy element.

In Step 402, the measured frequency is transmitted to a central control module within the reconfigurable floater. For example, through a wireless or wired connection, the reference wave frequency measurement module transmits measured frequency via a data packet to the central control module.

In Step 403, based on the measured frequency, the central control module automatically adjusts a natural heave frequency of the reconfigurable floater. For example, a controller of the central control module may adjust a buoyancy of the reconfigurable floater, or change an effective water plane area of the reconfigurable floater, or adjust a position of the movable plates, or a combination thereof. It is further envisioned that the Steps 401-403 may be repeated to maintain a natural heave frequency of the reconfigurable floater to the measured frequency.

In Step 404, a power is generated via the one or more power take-off devices. For example, a motion of the reconfigurable floater translates to a linear motion via the one or more power take-off devices to the generate power. As a first end of the one or more power take-off devices is connected to the reconfigurable floater and a second end of the one or more power take-off devices is connected to the submerged buoyancy element, one or more power take-off devices generates power from the movements of the reconfigurable floater and the submerged buoyancy element.

According to the U.S. Energy Information Administration (EIA), the ocean wave energy along the U.S. continental shelf is estimated to be 2.64 trillion kwh per annual, or equivalent to 60% of the U.S. energy consumption in 2019. The SWEC system 100 may potentially provide a wave energy harvest concept that is commercially viable, reducing the U.S. dependence on energy import and reducing energy-related emissions.

As described above, the SWEC system 100 may adjust their effective wet-surface area and/or effective mass such that its natural period will closely match the peak period of incident wave state and hence maximize motion response for power generation. In addition to the benefits described above, the SWEC system 100 disclosed herein achieves HIGHER motion response for a WIDER wave spectrum through reconfiguration to adapt its natural period to the peak period of the incident wave states and, hence, harvest MORE wave energy for power generation. With the increased capability of capturing wave energy, the Levelized Cost of Energy (LCOE) can be reduced and eventually achieve commercial viability.

Unless defined otherwise, all technical and scientific terms used have the same meaning as commonly understood by one of ordinary skill in the art to which these systems, apparatuses, methods, processes and compositions belong. The singular forms "a," "an," and "the" include plural referents, unless the context clearly dictates otherwise. As used here and in the appended claims, the words "comprise," "has," and "include" and all grammatical variations thereof are each intended to have an open, non-limiting meaning that does not exclude additional elements or steps. "Option-ally" means that the subsequently described event or circumstances may or may not occur. The description includes instances where the event or circumstance occurs and instances where it does not occur. When the word "approximately" or "about" are used, this term may mean that there can be a variance in value of up to ±10%, of up to 5%, of up to 2%, of up to 1%, of up to 0.5%, of up to 0.1%, or up to 0.01%. Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed as new and desired to be protected by Letters Patent of the United States is:

1. A smart wave energy converter, comprising:
   a reconfigurable floater, wherein the reconfigurable floater:
   has a base portion and an upper portion, wherein the upper portion extends a height above the base portion and is tapered to be wider at the base portion and narrower with height to form a cone- or wedge-shaped column; and
   is configured to float such that at an air-water interface is intermediate a top and a bottom of the upper portion;
   a reference wave frequency measurement module;
   a central control module;
   a submerged buoyancy element;
   one or more power take-off devices; and
   an anchoring system;
   wherein the reconfigurable floater is connected to the submerged buoyancy element by the one or more power take-off devices;
   wherein the submerged buoyancy element is connected to the anchoring system;
   wherein the reconfigurable floater comprises:
     a ballast system;
     openings, comprising:
       one or more central openings extending from the base portion to the top of the upper portion; and
       one or more outer openings extending through the base portion around a perimeter of the upper portion; and
     movable plates configured to move relative to the openings to adjust a size of the openings to alter a natural heave frequency of the reconfigurable floater;
   wherein the reference wave frequency measurement module is configured to measure a frequency of a wave state and to transmit a measured frequency to the central control module; and
   wherein the central control module is configured to adjust the ballast system and the moveable plates to change an effective mass, an effective water plane area of the reconfigurable floater, and an added mass to match the natural heave frequency of the reconfigurable floater to the measured frequency.

2. The smart wave energy converter of claim 1, wherein the reconfigurable floater comprises a housing containing the central control module.

3. The smart wave energy converter of claim 1, wherein the reference wave frequency measurement module is mounted on the submerged buoyancy element.

4. The smart wave energy converter of claim 1, wherein the reference wave frequency measurement module comprises a pressure transducer.

5. The smart wave energy converter of claim 1, wherein the anchoring system comprises one or more of taut lines, a catenary, a tendon, a fixed foundation, or a suspended deadweight.

6. The smart wave energy converter of claim 1, wherein the central control module comprises a controller to adjust the ballast system and the moveable plates to match the natural heave frequency of the reconfigurable floater to the measured frequency.

7. The smart wave energy converter of claim 1, wherein the reconfigurable floater has an adjustable natural heave frequency in the range from about 3 seconds to about 10 seconds.

8. A wave farm comprising two or more smart waver energy converters as claimed in claim 1.

9. A method of harvesting wave energy, the method comprising:
   disposing a smart wave energy converter as claimed in claim 1 in a body of water;
   measuring the frequency of the wave state in the body of water;
   transmitting the measured frequency to the central control module;
   automatically adjusting, via the central control module, the natural heave frequency of the reconfigurable floater; and
   generating power via the one or more power take-off devices.

10. The method of claim 9, wherein the automatically adjusting comprises adjusting a buoyancy of the reconfigurable floater.

11. The method of claim 9, wherein the automatically adjusting comprises changing the effective water plane area of the reconfigurable floater.

12. The method of claim 9, wherein the automatically adjusting comprises adjusting a position of one or more of the moveable plates in the base of the reconfigurable floater.

13. The method of claim 9, further comprising repeating the measuring, transmitting, and automatically adjusting to maintain the natural heave frequency of the reconfigurable floater to the measured frequency.

* * * * *